US00RE39721E

(19) United States
(12) Reissued Patent
Garton

(10) Patent Number: US RE39,721 E
(45) Date of Reissued Patent: Jul. 10, 2007

(54) DISCHARGE OUTLET FOR DOUBLE WALL CONTAINMENT TANK ASSEMBLY

(75) Inventor: Darwin Garton, Lincoln, NE (US)

(73) Assignee: Snyder Industries, Inc., Lincoln, NE (US)

(21) Appl. No.: 10/717,425

(22) Filed: Nov. 19, 2003

Related U.S. Patent Documents

Reissue of:
(64) Patent No.: 6,318,581
Issued: Nov. 20, 2001
Appl. No.: 09/519,326
Filed: Mar. 6, 2000

(51) Int. Cl.
*B65D 87/00* (2006.01)

(52) U.S. Cl. ..... 220/565; 220/4.12; 220/661

(58) Field of Classification Search ..... 220/661, 220/567.2, 4.12, 567.3, 565
See application file for complete search history.

(56) References Cited

U.S. PATENT DOCUMENTS

| | | | | |
|---|---|---|---|---|
| 665,349 | A | | 1/1901 | Sewall |
| 963,454 | A | | 7/1910 | Meinecke |
| 1,330,868 | A | | 2/1920 | Harrison |
| 1,520,230 | A | | 12/1924 | Flath |
| 1,544,024 | A | | 6/1925 | Moeller et al. |
| 1,551,007 | A | | 8/1925 | Bruns |
| 1,970,940 | A | | 8/1934 | Laube |
| 1,983,118 | A | | 12/1934 | Bourque |
| 2,043,045 | A | | 6/1936 | Krinard |
| 2,185,026 | A | | 12/1939 | Goecke |
| 2,637,459 | A | | 5/1953 | Jordan |
| 2,777,295 | A | | 1/1957 | Bliss et al. |
| 3,069,045 | A | * | 12/1962 | Haumann et al. ..... 220/592.27 |
| 3,111,074 | A | | 11/1963 | Kennard, Jr. et al. |
| 3,125,388 | A | | 3/1964 | Costantini et al. |
| 3,304,852 | A | | 2/1967 | Lande |
| 3,338,010 | A | | 8/1967 | Waugh |
| 3,352,443 | A | | 11/1967 | Sattelberg et al. |
| 3,383,004 | A | | 5/1968 | Closner |
| 3,473,689 | A | | 10/1969 | Hutter |
| 3,760,972 | A | | 9/1973 | McKirnan |
| 3,930,590 | A | | 1/1976 | Ebbrell |
| 4,425,743 | A | | 1/1984 | Bartur |
| 4,513,550 | A | | 4/1985 | Kotcharian |
| 4,519,415 | A | | 5/1985 | Carn |
| 4,533,062 | A | | 8/1985 | Krautkramer |
| 4,584,802 | A | | 4/1986 | Casselman et al. |
| 4,651,894 | A | | 3/1987 | Ebert |
| 4,697,618 | A | | 10/1987 | Youtt et al. |
| 4,714,170 | A | | 12/1987 | Scott |
| 4,840,283 | A | | 6/1989 | Lillywhite et al. |
| 4,865,220 | A | * | 9/1989 | Wiegand ..... 220/567.1 |
| 4,871,081 | A | | 10/1989 | Ershig |
| 4,934,553 | A | | 6/1990 | McCarthy |
| 4,960,222 | A | | 10/1990 | Fields, III |
| 4,976,912 | A | | 12/1990 | Madle et al. |
| 5,033,638 | A | | 7/1991 | Cruver et al. |
| 5,056,680 | A | | 10/1991 | Sharp |
| 5,060,815 | A | | 10/1991 | Wendling et al. |
| 5,117,810 | A | | 6/1992 | Threatt |
| 5,161,690 | A | | 11/1992 | Foshaug |

(Continued)

*Primary Examiner*—Stephen Castellano
(74) *Attorney, Agent, or Firm*—Hovey Williams LLP

(57) ABSTRACT

A discharge outlet is provided for attachment to a double wall containment tank assembly having an inner tank and an outer containment vessel. The discharge outlet includes a conduit fluidically connected to the fluid receiving chamber of the inner tank and extending exteriorly of the outer containment vessel, a flexible annular sealing member positioned between the inner tank and the outer containment vessel, and couplers for attaching the sealing member to the inner tank and the outer vessel in surrounding relationship to the conduit. The containment area between the two tanks which is designed fro containing spills from the inner tank is thereby fluidically isolated form the access opening through which the conduit passes.

36 Claims, 3 Drawing Sheets

U.S. PATENT DOCUMENTS

| | | | |
|---|---|---|---|
| 5,165,569 | A | 11/1992 | Furuhashi et al. |
| 5,201,432 | A | 4/1993 | Elvin-Jensen |
| 5,201,435 | A | 4/1993 | Harding et al. |
| 5,285,922 | A | 2/1994 | Harding |
| 5,287,986 | A | 2/1994 | Frost |
| 5,333,752 | A | 8/1994 | Harding, Jr. |
| 5,374,026 | A | 12/1994 | Spurrier et al. |
| 5,430,927 | A | 7/1995 | Rogers |
| 5,490,603 | A | 2/1996 | Davis |
| 5,495,695 | A | 3/1996 | Elliott, Jr. |
| 5,544,777 | A | 8/1996 | Watson |
| 5,544,974 | A | 8/1996 | Berg et al. |
| 6,192,940 | B1 * | 2/2001 | Koma et al. ..... 138/122 |

* cited by examiner

DISCHARGE OUTLET FOR DOUBLE WALL CONTAINMENT TANK ASSEMBLY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention concerns a discharge outlet for use with a double wall tank assembly used for storing and dispensing large quantities of liquid. More particularly, it is concerned with a sealing boot for the discharge outlet which enables the liquid to be dispensed through openings in the side walls of the inner tank and outer vessel of the double wall tank assembly.

2. Description of the Prior Art

Storage of liquid in bulk is well known, and has evolved in importance due to environmental concerns over the escape of chemicals. In the past, it was common to store chemicals underground in large tanks where gravity was used to fill the vessels and the contents were periodically pumped for use. However, the problems associated with leading underground storage tanks has increased the usage of above ground storage tanks. Typically, one or more above-ground vessels have been placed in a "tank farm" where a concrete pad and berm help to contain and capture any problem. Rainwater received in the containment area must be monitored and treated if leakage is detected. This has proven very expensive, as the rainwater represents a large volume of liquid even though the leakage is isolated.

As a result, storage containers have been developed which include a double walled construction. Examples of containment tanks utilizing such construction are shown in U.S. Pat. Nos. 5,287,986 to Frost and U.S. Pat. No. 5,333,752 to Harding, Jr. While the double walled construction therein is an improvement over single walled tanks, they require filling and discharge to be accomplished from atop the tanks. This requires extra energy to be expended in pumping the liquid. The need to prevent leakage from a double walled containment tank assembly has thus not heretofore permitted effective discharge openings through the sidewalls of the component inner and outer tanks. Thus, there has developed a need for a containment tank assembly which is capable of use in a variety of environments, minimizes, leakage, and has reduced energy demands.

SUMMARY OF THE INVENTION

These objects have largely been met through the discharge outlet and sealing boot of the present invention. That is to say, the present invention effectively seals openings provided in the sidewalls of a containment tank assembly having an inner tank and an outer vessel. Moreover, the discharge outlet includes a sealing boot which captures liquid which might leak into the containment area between the inner tank and outer vessel. Advantageously, the sealing boot is flexible and thus accommodates relative movement between the inner tank and outer vessel, such as may be encountered by expansion of the inner tank during filling and external forces applied to the outer vessel.

The discharge outlet of the present invention broadly includes an inner tank flange assembly, an outer vessel flange assembly, and a sealing boot interconnecting the two flange assemblies, piping or conduit is preferably provided which extends from the inner flange assembly exteriorly of the outer vessel for attachment of a valve, piping or the like to effect the transfer of liquid from the tank. The sealing boot is preferably of a flexible material and is provided in the shape of a tire, whereby liquid leaking may be readily visually detected and repair of the inner tank assembly may be effected without deterioration of the containment capabilities of the double wall tank assembly. The piping of the discharge outlet, which is positioned relatively near the bottom of the side of the double wall tank assembly, may be further provided with additional piping interiorly of the inner tank and include a pipe opening near the bottom wall of the inner tank, thereby facilitating removal of most of the liquid within the inner tank when it is desired to be emptied.

These and other advantages of the discharge outlet of the present invention will be readily appreciated by those skilled in the art with reference to the drawings and the following description.

DESCRIPTION OF THE PREFERRED EMBODIMENT

Figure 1:
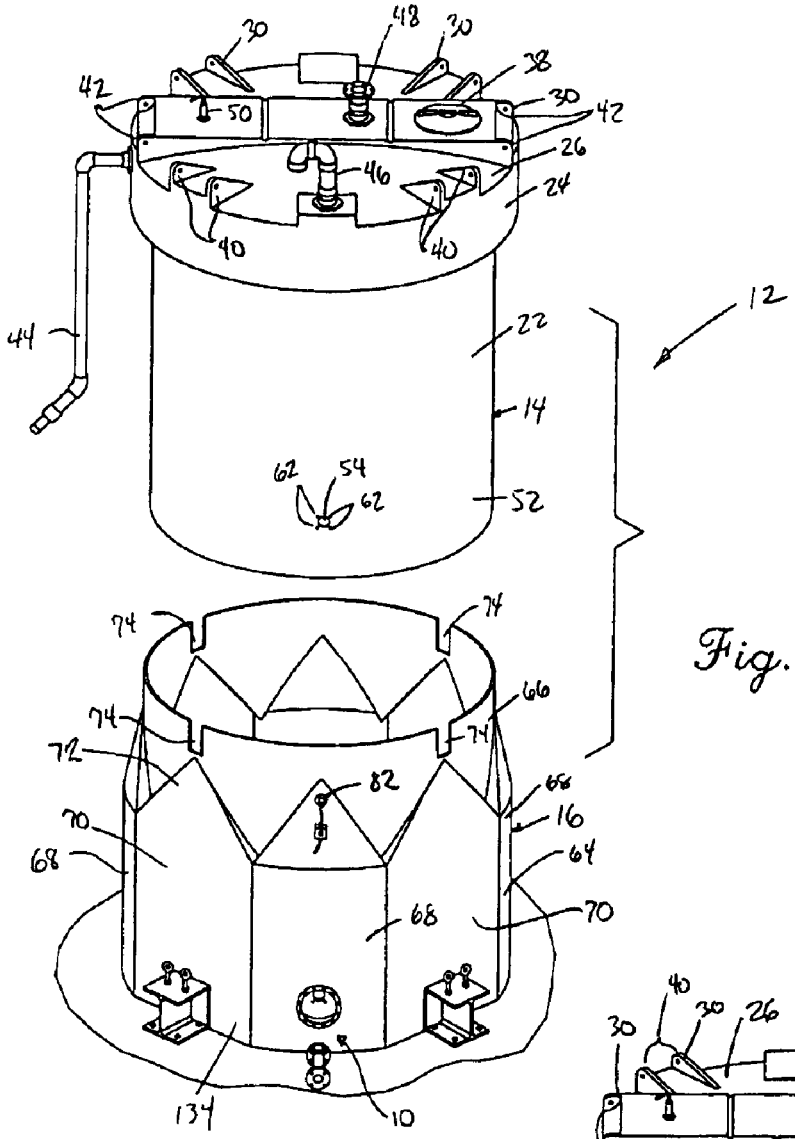
FIG. 1 is a exploded view of a double wall containment tank assembly, showing the opening in the outer vessel for receiving the discharge outlet positioned relatively low on the side thereof.
Figure 2:
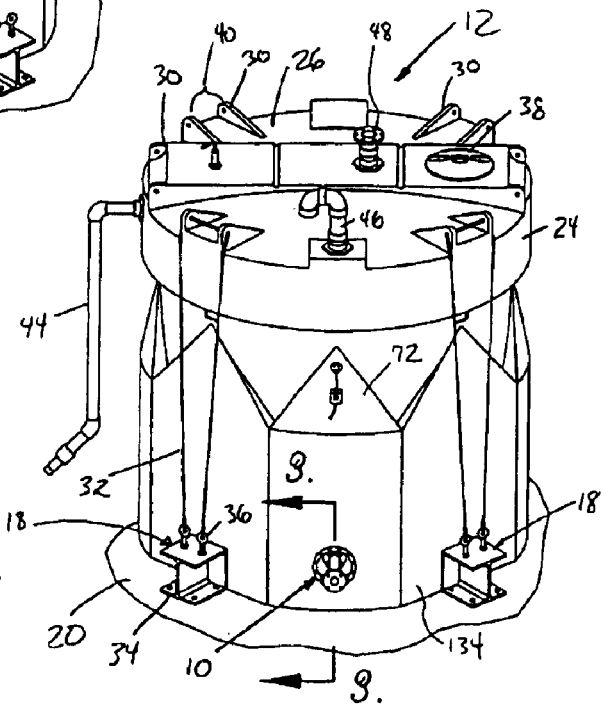
FIG. 2 is a perspective view of the double wall containment tank assembly shown in FIG. 1 with the inner tank nested in the outer vessel and showing anchor assemblies for holding the double wall containment tank assembly against movement relative to the supporting surface.

Referring now to the drawing, a discharge outlet 10 in accordance with the present invention is provided for mounting as part of a double wall containment tank assembly 12 used for bulk storage of liquids. The double wall containment tank assembly 12 includes an inner tank 14, an outer vessel 16, and a plurality of anchor assemblies 18 for securing the tank assembly 12 to a pad or other supporting surface 20. The details of the structure of the tank assembly 12 are further described in my U.S. Patent Application entitled Containment Tank Assembly filed contemporaneously herewith as application Ser. No. 09/519,323 filed Mar. 6, 2000, the disclosure of which is incorporated herein by reference.

In greater detail, the inner tank 14 includes a lower section 22, an upper section 24 which extends radially outwardly of lower section 22 and is connected thereto by a lip presenting a trough, and a roof 26 which acts as a cover to define a liquid-receiving chamber 28 therewithin. The lip includes a plurality of circumferentially spaced chutes to permit drainage from the trough back into the interior of the lower section 22. A plurality of upstanding lugs 30 project upwardly from the roof 26 for the attachment of cables 32 of anchor assemblies 18 thereto. The anchor assemblies 18 also include anchors 34 which are bolted into the supporting surface 20 (such as a concrete pad) and connected to the cables 32 by eyebolts 36. A manhole cover 38 is interfitted into a manhole in the roof 26 to permit access into the chamber 28. The lugs 30 provide pairs of tie-down flanges 40 and lifting flanges 42, each provided with holes for the passage of cables 32 therethrough. An opening through the side of the upper section 24 permits the attachment of fill pipe 44 thereto. In addition, the roof 26 receives vent 46, filler inlet 48, and level indicator 50 thereon, the latter including a probe for determining the amount of the liquid in the chamber 28. The lower section 22 includes a substantially cylindrical sidewall 52 and a bottom wall 58 which are joined at the lower perimeter 60 of the sidewall 52. A port 54 is provided in the cylindrical sidewall proximate to the lower perimeter 60, with four surrounding circumferentially spaced bolt holes 62 provided through the side wall 52.

The outer vessel 16 includes a multifaceted lower wall portion 64 and a substantially cylindrical upper wall portion 66. The lower wall portion 64 includes a plurality of alternating arcuate sections 68 and chord sections 70. The lower wall portion 64 tapers inwardly in transition area 72 to cylindrical wall portion 66, which lies closely adjacent the cylindrical sidewall 52 when the inner tank 14 is nested in the outer tank 16. The upper wall portion 66 has an upper margin provided with a plurality of notches 74 for receiving the chutes of the inner tank 14 therein. The arcuate sections 68 are spaced from the cylindrical sidewall 52 of the inner tank 14 to define therebetween a containment area 76. An access opening 78 is provided in one of the arcuate sections 68 for receipt of the discharge outlet 10 therein, with a plurality of surrounding, circumferentially spaced holes 80 for the receipt of the bolts therethrough. A leak detection system 82 may be mounted in the lower wall portion 64 and include a probe extending downwardly into the containment area 76 to detect the presence of liquid therein. The base wall 84 connects to the lower wall portion 64 and receives the bottom wall 58 of the inner tank 14 thereon. Both the inner tank 14 and the outer vessel 16 are rotationally molded of synthetic resin, such as high density linear polyethylene or cross-linked, high density polyethylene.

The discharge outlet 10 includes an inner coupler assembly 86, an coupler flange assembly 88, sealing boot 90, and piping 92. The inner coupler assembly includes interior flange 94 and intermediate flange 96 which each include a ring 98 and a neck 100, each flange 94 and 96 having a central opening 102 to permit the flow of liquid therethrough. Annular gaskets 104 and 106 abut the cylindrical sidewall 52 in sealing relationship thereto. The rings 98 and gaskets 104 and 106 each include apertures 108 aligned in registry with the bolt holes 62 in the cylindrical sidewall 52 for the receipt of bolts 110 therethrough. The bolts 110 are secured by suitable nuts and washers.

The sealing boot 90 is located in the containment area 76 and preferably rotationally molded of synthetic resin such as either high density linear or low density polyethylene for flexibility. The sealing boot 90 is provided in the shape of a tire, including a flat inner wall 112 provided with surrounding, circumferentially spaced apertures 114 for the receipt of bolts 110 therethrough, and a central hole 56 for alignment in registry with the port 54 and the central opening 102 of the neck 100. An circumferentially extending cup-shaped protrusion 116 extends radially outwardly from the flat inner wall 112, with flat outer wall 118 extending radially inwardly therefrom in spaced, opposed relationship to flat inner wall 112. The flat outer wall 118 includes an inner margin 120 having a transverse dimension [D] which is substantially the same as that of the access opening 78 and [smaller] *larger* than the diameter of the central hole 56 of the flat inner wall 112. The sealing boot 90 thus defines an annular, circumferentially extending channel 122 which permits flexing of the boot 90 and captures liquid leaking past the inner coupler assembly.

Figure 3:
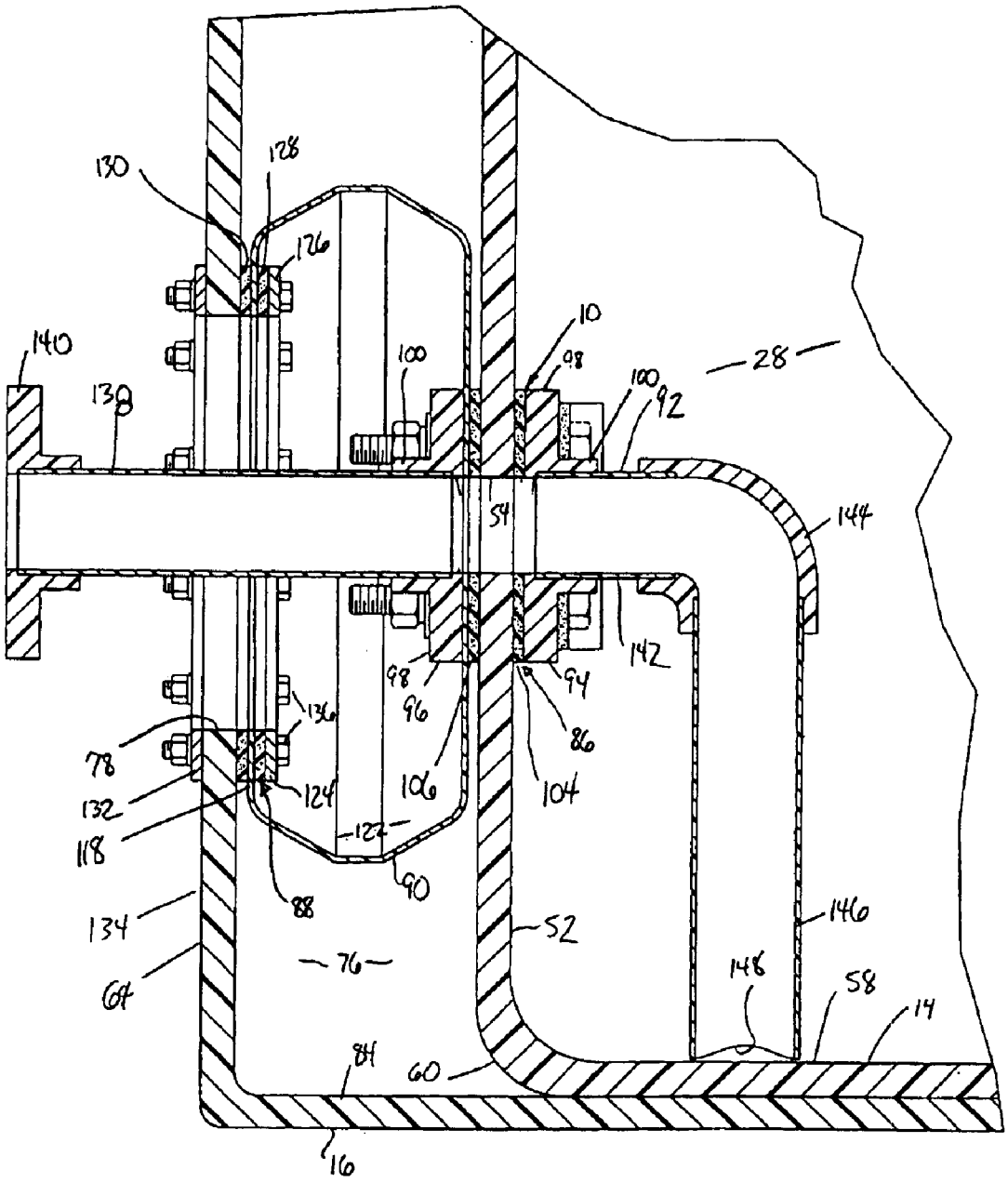
FIG. 3 is an enlarged, vertical sectional view taken through line 3—3 of FIG. 2 showing the discharge outlet mounted on the double wall containment tank assembly.
Figure 4:
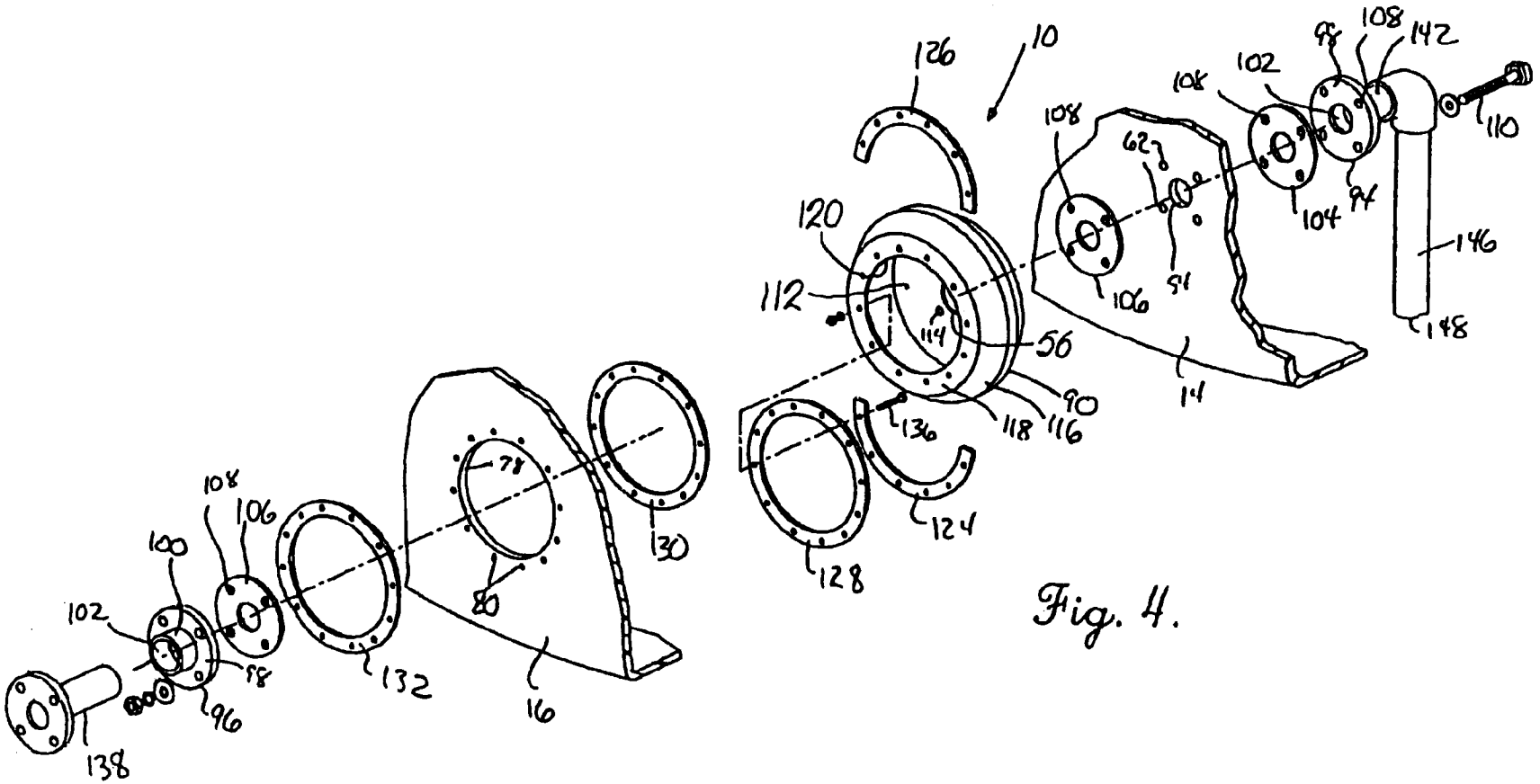
FIG. 4 is an exploded view of the discharge outlet hereof.

The outer coupler assembly 88 has an inner flange provided as semi-annular inner flange plate halves 124 and 126 positioned within the channel 122, annular gaskets 128 and 130 sandwiching the flat outer wall 118 therebetween, and outer flange plate 132 for engagement against the exterior 134 of the outer vessel. The inner flange plate halves 124 and 126 and the outer flange plate 132 are preferably stainless steel or other corrosion resistant metal. The flat outer wall 118, inner plate halves 124 and 126, gaskets 128 and 130, and outer flange plate include holes which are positioned in registry with the holes 80 in the outer vessel 16 for receipt of bolts 136 therethrough. The bolts 136 are secured in place by suitable nuts and washers as shown in FIGS. 3 and 4. The gaskets 104 and 106 and also 128 and 130 are preferably elastomeric, and provided of a chemically resistant natural or synthetic rubber material.

The piping 92 is preferably of a chemical resistant synthetic resin material such as polyvinyl chloride and provides a conduit for the passage of liquid in the chamber 28 out of the containment tank assembly 12. The piping 12 includes a discharge tube 138 having an inner end which is preferably chemically welded to the neck 100 of the intermediate flange 96 and an outer end which receives a connection flange 140 for the attachment of further piping or a discharge valve to control the flow of liquid from the chamber 76. An inner tube 142 extends into the chamber 76 and has one end which is preferably chemically welded to the neck 100 of interior flange 94 and another end which receives thereon elbow 144. The elbow 144 is oriented downwardly and a pickup pipe 146 is connected at one end thereto, the pickup pipe 146 having an open, lower end 148 adjacent the bottom wall for providing an intake into the pipeline 92 for the discharge of liquid therethrough.

In use, the sealing boot 90 and the access opening 78 of the outer vessel are trimmed to fit with the flange plate halves 124, 126 and outer flange plate 132. The flange plate halves 124, 126 are placed in the channel 122 with the gaskets positioned as shown in FIG. 3 and the bolts 136 are inserted and tightened. The inner tank 14 is lowered into the outer vessel 14 in nesting relationship with the chutes received in the inner notches and the port 54 aligned with the access opening 78. The inner tank 14 is then preloaded, and the port 54 is trimmed to receive the inner flange assembly 86. The inner tube 142, elbow 144 and pickup pipe 146 are installed into the inner flange assembly 86 mounted on the cylindrical sidewall 52 to permit liquid to flow through the central opening 102. The discharge tube 138 with connection flange 140 is then chemically welded to the neck 100 of intermediate flange 96, and a control valve such as a ball valve or further piping is attached to the connection flange to permit filling of the chamber 28.

The discharge outlet 10 thus effectively permits the inner tank 14 to be emptied of liquid through gravity rather than pumping, because the integrity of the containment area 76 is preserved by the sealing boot 90. The boot 90 is sufficiently flexible to permit limited relative movement between the inner tank 14 and the outer vessel 16 due to seismic events, wind forces or thermal expansion. If liquid begins to leak from the inner tank 14 through the inner flange assembly 86, the leakage is nonetheless contained within the channel 122 and can be readily visually observed. Other leaking from the inner tank 14 is confined to the containment area 76 between the inner tank 14 and outer vessel 16, such that even if the leakage rises above the access opening 78 in the side of the outer vessel 16, it does not escape.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the doctrine of equivalents to determine and assess the reasonably fair scope of his invention as pertains to any apparatus not materially departing from but outside the literal scope of the invention as set out in the following claims.

What is claimed is:

1. A discharge outlet for a double walled containment tank having an inner tank having a chamber for receiving liquid therein and a port for the passage of liquid therethrough, and an outer containment vessel having an access opening aligned with the port, the inner tank and the outer containment vessel defining a containment area therebetween, said discharge outlet comprising:

a conduit fluidically coupled to the inner tank;

a flexible, annular sealing member positioned between the inner tank and the outer containment vessel in substantial alignment with the port and the access opening in surrounding relationship to said conduit, *said sealing member presenting a pair of opposed holes, one of said holes being of substantially greater diameter than the other of said holes*;

a first coupler for connecting said sealing member to the inner tank around the port; and a second coupler for connecting said sealing member to the outer containment vessel around the access opening and thereby fluidically isolating the containment area from the access opening.

2. A discharge outlet as set forth in claim 1, wherein said sealing member includes a circumferentially extending cup-shaped protrusion.

3. A discharge outlet as set forth in claim 2, wherein said sealing member is a flexible synthetic resin material.

4. A discharge outlet as set forth in claim 3, wherein said sealing member includes a substantially flat inner wall extending radially inwardly from said protrusion and having [a central] *said smaller diameter* hole therein for permitting the passage of liquid therethrough.

5. A discharge outlet as set forth in claim 4, wherein said first coupler includes an inner flange positioned in the chamber and an outer flange positioned in the containment area for receiving a wall of the inner tank therebetween, each of said inner flange and [intermediate] *outer* flange*s* having a central opening for the passage of liquid therethrough.

6. A discharge outlet as set forth in claim 5, wherein said conduit includes a discharge tube fluidically connected to said intermediate flange and having a length sufficient to extend exteriorly of the outer vessel.

7. A discharge outlet as set forth in claim 6, wherein said conduit includes an inner tube fluidically connected to said inner flange.

8. A discharge outlet as set forth in claim 3, wherein said sealing member includes a substantially flat outer wall extending radially inwardly from said protrusion and having an inner margin.

9. A discharge outlet as set forth in claim 8, wherein said inner margin is spaced outwardly from said conduit.

10. A discharge outlet as set forth in claim 3, wherein said second coupler includes an inner flange plate [positioned in said channel].

11. A discharge outlet as set forth in claim 10, wherein said inner flange is provided as two semi-annular flange plate halves.

12. A discharge outlet as set forth in claim 11, wherein said second coupler includes an outer flange plate [and positioned relatively exteriorly of said flat outer wall].

13. A double walled containment tank assembly comprising:

an inner tank having a chamber for receiving liquid therein and a port for the passage of liquid therethrough;

an outer containment vessel having an access opening aligned with the port, the inner tank and the outer containment vessel defining a containment area therebetween; and a discharge outlet, said discharge outlet including:

a conduit fluidically coupled to said inner tank;

a flexible, annular sealing member positioned between said inner tank and said outer containment vessel in substantial alignment with said port and said access opening in surrounding relationship to said conduit, *said sealing member presenting a pair of opposed holes, one of said holes being of substantially greater diameter than the other of said holes*;

a first coupler for connecting said sealing member to said inner tank around said port; and a second coupler for connecting said sealing member to said outer containment vessel around said access opening and thereby fluidically isolating said containment area from said access opening.

14. A containment tank as set forth in claim 13, wherein said sealing member includes a circumferentially extending cup-shaped protrusion.

15. A containment tank as set forth in claim 14, wherein said sealing member is a flexible synthetic resin material.

16. A containment tank as set forth in claim 15, wherein said sealing member includes a substantially flat inner wall extending radially inwardly from said protrusion and having [a central] *said smaller diameter* hole therein for permitting the passage of liquid therethrough.

17. A containment tank as set forth in claim 16, wherein said first coupler includes an inner flange positioned in said chamber and an outer flange positioned in the containment area for receiving a wall of said inner tank therebetween, each of said inner flange and [intermediate] *outer* flange*s* having a central opening for the passage of liquid therethrough.

18. A containment tank as set forth in claim 17, wherein said conduit includes a discharge tube fluidically connected to said intermediate flange and having a length sufficient to extend exteriorly of said outer vessel.

19. A containment tank as set forth in claim 18, wherein said conduit includes an inner tube fluidically connected to said inner flange and extending into said chamber adjacent a bottom wall of said inner tank.

20. A containment tank as set forth in claim 15, wherein said sealing member includes a substantially flat outer wall extending radially inwardly from said protrusion and having an inner margin, said outer wall being positioned proximate said outer vessel.

21. A containment tank as set forth in claim 20, wherein said inner margin is spaced outwardly from said conduit.

22. A containment tank as set forth in claim 15, wherein said second coupler includes an inner flange plate [positioned in said channel].

23. A containment tank as set forth in claim 22, wherein said inner flange is provided as two semi-annular flange plate halves.

24. A containment tank as set forth in claim 23, wherein said second coupler includes an outer flange plate [and positioned relatively exteriorly of said flat outer wall and proximate said outer vessel].

*25. A discharge outlet for a double walled containment tank having an inner tank provided with a chamber for receiving liquid therein and having a side wall provided with a port therein for passage of liquid therethrough, and an outer containment vessel having a wall portion provided with an access opening having a predetermined area and positioned generally across from the port in the side wall of the inner tank, the inner tank and the outer containment vessel defining a containment area therebetween, said discharge outlet comprising:*

*a conduit coupled to the port in the side wall of the inner tank for fluidic communication of the conduit with the inner tank;*

*said conduit extending through the access opening in the outer containment vessel;*

*a flexible annular boot member positioned in surrounding relationship to the conduit and having opposed annular end portions, each of said annular end portions defining a hole, one of said holes having a diameter greater than the diameter of the other of said holes;*

*a first coupler sealingly coupling the end portion of the boot member having said larger diameter hole to the outer containment vessel around the access opening therein; and*

*a second coupler sealingly coupling the end portion of the boot member having said smaller diameter hole adjacent to the conduit in spaced relationship from the first coupler,*

*the area of said access opening being greater than the cross-sectional area of that part of the conduit extending through said access opening,*

*whereby said boot member prevents leakage of liquid from the double walled containment tank that may collect in the containment area.*

*26. A discharge outlet as set forth in claim 25, wherein the boot member is sufficiently flexible to permit limited relative movement between the inner tank and the outer containment vessel.*

*27. A discharge outlet as set forth in claim 25, wherein said first coupler is annular and spaced radially outwardly of said conduit to permit limited relative movement between the conduit and the containment vessel.*

*28. A discharge outlet as set forth in claim 25, wherein said other opposed annular end portion of the boot member is sealingly coupled to the conduit adjacent the port in the side wall of the inner tank.*

*29. A discharge outlet as set forth in claim 25, wherein said second coupler sealingly couples said other end portion to said inner tank.*

*30. A discharge outlet as set forth in claim 25, wherein said boot member includes a circumferentially extending cup-shaped protrusion.*

*31. A discharge outlet as set forth in claim 30, wherein said cup-shaped protrusion has a maximum cross-sectional area greater than the area of the access opening.*

*32. A discharge outlet as set forth in claim 25, wherein said boot member is of a flexible synthetic resin material.*

*33. A discharge outlet as set forth in claim 25, said boot member having first and second outer end portions, wherein said first outer end portion of the boot member has a unitary first annular wall, a first annular gasket between the side wall portion of the outer containment vessel and the first annular wall of the boot member to prevent leakage of fluid from the containment area of the tank through said access opening of the containment vessel.*

*34. A discharge outlet as set forth in claim 33, wherein said second end portion of the boot member has a unitary second annular wall and a second annular gasket surrounding the conduit and sealingly engaging the second annular wall of the boot member to prevent leakage of fluid from the containment area between the inner tank and the containment vessel.*

*35. A discharge outlet as set forth in claim 25, said annular boot being located within said containment area.*

*36. A discharge outlet as set forth in claim 25, said inner tank having a base, an upright sidewall, and an upper end, said outer containment vessel having a base, an upright sidewall opposed to said inner tank sidewall, and an upper end, said discharge outlet located closer to said inner tank and containment vessel bases than said inner containment and containment vessel upper ends.*

* * * * *